(12) United States Patent
Smith

(10) Patent No.: US 11,867,553 B2
(45) Date of Patent: Jan. 9, 2024

(54) MOBILE WEIGHING SCALE AND METHOD

(71) Applicant: BUCKEYE SCALE, LLC, Walton Hills, OH (US)

(72) Inventor: Steven Edward Smith, Ravenna, OH (US)

(73) Assignee: BUCKEYE SCALE, LLC, Walton Hills, OH (US)

( * ) Notice: Subject to any disclaimer, the term of this patent is extended or adjusted under 35 U.S.C. 154(b) by 400 days.

(21) Appl. No.: 17/147,705

(22) Filed: Jan. 13, 2021

(65) Prior Publication Data

US 2021/0131858 A1    May 6, 2021

Related U.S. Application Data

(63) Continuation of application No. 16/277,251, filed on Feb. 15, 2019, now Pat. No. 10,962,406.

(Continued)

(51) Int. Cl.
*G01G 21/23*    (2006.01)
*G01G 21/28*    (2006.01)
(Continued)

(52) U.S. Cl.
CPC .............. *G01G 21/23* (2013.01); *B62B 3/12* (2013.01); *G01G 21/22* (2013.01); *G01G 21/28* (2013.01);
(Continued)

(58) Field of Classification Search
CPC ........ G01G 21/23; G01G 21/22; G01G 21/28; G01G 19/52; G01G 5/003; G01G 15/006; B62B 3/12; B62B 3/04; B62B 2203/50
(Continued)

(56) References Cited

U.S. PATENT DOCUMENTS 3,472,329 A    10/1969    Smith
3,596,725 A    8/1971    Homs
(Continued)

FOREIGN PATENT DOCUMENTS

CN    104949747    9/2015
CN    105547441    5/2016
GB    1497138 A    1/1978

OTHER PUBLICATIONS

SAWE FRP Proposal Actual Measurement Requirements and Methods by Brad Hill Principal Technician Boeing Integrated Defense Systems for Presentation at the 67th Annual Conference of Society of Allied Weight Engineers, Inc. Seattle, Washington, , Hill, May 17-22, 2008) (Year: 2008).*

(Continued)

*Primary Examiner* — Jacques M Saint Surin
(74) *Attorney, Agent, or Firm* — John Maldjian, Esq.; David D'Amato, Esq.; Stevens & Lee PC

(57) ABSTRACT

A mobile weighing apparatus includes a base tubing, a column extending from the base tubing, a handle extending from the column, a plurality of wheels, a weighing platform, and a plurality of load cells coupled to or between the base tubing and the weighing platform. The weighting platform may be suspended from the load cells, such as with wire rope bolts, such that a force applied to the column does not affect weighment of an object on the weighing platform. The apparatus may include a kingpin-less swivel rear wheel, a rear wheel brake to preclude rotation of the rear wheel about an axle of the rear wheel, and an actuator to actuate the rear brake when the rear wheel is in any position over a 360-degree range. The wheels may be positioned adjacent respective corners of a triangularly shaped base tubing, and the apparatus may further include a clinometer.

20 Claims, 8 Drawing Sheets

Related U.S. Application Data

(60) Provisional application No. 62/666,729, filed on May 4, 2018.

(51) Int. Cl.
    *G01G 21/22*     (2006.01)
    *B62B 3/12*     (2006.01)
    *G01G 5/00*     (2006.01)
    *G01G 15/00*     (2006.01)

(52) U.S. Cl.
    CPC .......... *B62B 2203/50* (2013.01); *G01G 5/003* (2013.01); *G01G 15/006* (2013.01)

(58) Field of Classification Search
    USPC ........................................................ 177/132
    See application file for complete search history.

(56) References Cited

U.S. PATENT DOCUMENTS

| | | | |
|---|---|---|---|
| 4,094,368 A * | 6/1978 | Sann .................. | G01G 23/14 |
| | | | 177/187 |
| 4,453,606 A | 6/1984 | Mokhbery et al. | |
| 4,666,004 A | 5/1987 | Raz | |
| 5,482,421 A | 1/1996 | Cummins et al. | |
| 5,717,167 A | 2/1998 | Filing | |
| 5,739,478 A | 4/1998 | Zefira | |
| 6,201,195 B1 | 3/2001 | Carey | |
| 6,222,137 B1 | 4/2001 | Handford | |
| 6,609,381 B1 | 8/2003 | Morgan | |
| 6,774,320 B2 * | 8/2004 | Simons ................ | G01G 19/18 |
| | | | 73/862.642 |
| 6,855,894 B1 | 2/2005 | Van Seumeren | |
| 9,815,036 B2 | 11/2017 | Maguire et al. | |
| 10,082,421 B2 * | 9/2018 | Jaeger .................... | G01G 19/52 |
| 10,962,406 B2 * | 3/2021 | Smith .................... | G01G 21/22 |
| 2012/0061531 A1 | 3/2012 | Ho | |
| 2012/0248719 A1 | 10/2012 | Rossini | |

OTHER PUBLICATIONS

"Model 680-P2 Portable Scales", Cambridge Scale Works, Inc.; Retrieved from: http://www.cambridgescale.com/680p.html Retrieved on: Apr. 20, 2018 (2 pages total).

"Portable Drum Scale—LPE Series Mild Steel Drum Scale", YouTube; Retreived from: https://www.youtube.com/watch?v=R2vvhlwcuCI Retrieved on: Apr. 20, 2018 (4 pages total).

"RoughDeck BDP Scale and Portablity Frame", YouTube; Retreived from: https://www.youtube.com/watch?v=db1rBlvEAjg Retrieved on: Apr. 20, 2018 (4 pages total).

"2888 Portable Floor Scale", YouTube, Retrieved from: https://www.youtube.com/watch?v=TRzw6q8Z_x0 Retrieved on: Apr. 20, 2018 (3 pages total).

"Easy Lift Equipment—Grip & Weigh Scale Attachments", YouTube, Retrieved from: https://www.youtube.com/watch?=idlQAQILyCk Retrieved on: Apr. 20, 2018 (4 pages total).

"Scale Pallet Truck—272936", YouTube, Retrieved from: https://www.youtube.com/watch?v=JN-hvUk27x0 Retrieved on: Apr. 20, 2018 (3 pages total).

"Weighing Scale Pallet Truck" IndiaMART InterMESH Ltd., Retrieved from: https://www.indiamart.com/proddetail/weighing-scale-pallet-truck-11873037855.html Retrieved on: Apr. 20, 2018.

"Roll-A-weigh Scale / Drum / wheelchair / warehouse / industrial SellEton.com", YouTube, Retrieved from: https://www.youtube.com/watch?v=ZF-jWjUch88 Retrieved on: Apr. 20, 2018 (2 pages total).

"PS CL10scale", YouTube, Retrieved from: https://www.youtube.com/watch?v=K73iq5hE9Hk Retrieved on: Apr. 20, 2018 (3 pages total).

LDS Portable Large Drum Scale 2000 lb., Retrieved from: http://www.1800scales.com/LDS_drum.html Retrieved on: Feb. 14, 2019 (4 pages total).

* cited by examiner

MOBILE WEIGHING SCALE AND METHOD

CROSS-REFERENCE TO RELATED APPLICATIONS

This application is a continuation of U.S. Utility patent application Ser. No. 16/277,251, filed Feb. 15, 2019, entitled "MOBILE WEIGHING SCALE AND METHOD," which claims the benefit of U.S. Provisional Application Ser. No. 62/666,729 filed May 4, 2018, entitled "MOBILE WEIGHING SCALE AND METHOD", which are incorporated herein by reference in their entirety.

FIELD OF INVENTION

Embodiments of the present invention generally relate to a weighing scale, and in particular relate to a mobile weighing scale and method.

BACKGROUND

Generally, objects to be weighed are carried to weighing scales for measurement. The objects may be, for example, barrels, cylinders, or other heavy objects. These objects may be heavy and difficult to transport to the weighing scales. The scales used in the industry have a platform to carry the objects. However, these platforms have a gap from the ground, which makes it necessary for the object to be lifted up before placing on the platform. As a result, lifting mechanisms such as beaks or clamps or other devices are used to lift the object before weighing.

Moreover, the object once placed on the platform of the weighing scale have to be placed back on the ground before transporting it to another location. Therefore, transporting the objects while on the weighing scale is difficult.

Accordingly, it is desirable to provide a mobile weighing scale capable of weighing an object at or near where the object is stored and or weighing the object and transporting the weighed objects to its storage location.

SUMMARY

Embodiments in accordance with the present invention provide a mobile weighing scale comprising a column, a weighing platform for supporting an object to be weighed, and a plurality of load cells for computing weighment of the object, the load cells connected to the weighing platform and mounted internal to the top of a base tubing, wherein the base tubing is attached to the weighing platform. The mobile weighing scale may further comprise a vibrator, removably attached at a proximal end of the weighing platform, for producing vibratory forces on the weighing platform to densify a material within the object to be weighed. The mobile weighing scale may further comprise an electronic indicator, attached to the column, for displaying the computed weighment of the object.

Embodiments in accordance with the present invention provide a mobile weighing scale comprising a column. Further, the mobile weighing scale comprising a weighing platform for supporting an object to be weighed, wherein the weighing platform is about 1 inch above the ground. Further, the mobile weighing scale comprising a plurality of load cells for computing weighment of the object and connected to the weighing platform, wherein the plurality of load cells are mounted internal to the top of a base tubing, wherein the base tubing is attached to the weighing platform. Further, the mobile weighing scale comprising a communication unit for wirelessly transmitting the computed weighment to a computing unit.

Embodiments in accordance with the present invention provide a method for weighing an object on a mobile weighing scale. The method comprising moving the weighing scale to an area for weighing; engaging a braking mechanism for holding the weighing scale at a desired position; placing the object to be weighed on a weighing platform of the weighing scale; computing weighment of the object by using a plurality of load cells; disengaging the braking mechanism after weighing of the object is complete; and moving the weighing scale with the object to a desired location by using a handle of the weighing scale.

Embodiments of the present invention provide a weighing scale that provides filling, weighing, and transporting of objects.

Embodiments of the present invention provide a weighing scale having a relatively low or ultra-low profile with respect to the ground. It is therefore contemplated by embodiments of this invention for the objects to be weighed to be easily be loaded or unloaded without requiring additional lifting or transportation mechanisms, like beaks or clamps. Further, the weighing scale may be fabricated with heavy duty tube metal such as steel for a durable and accurate performance.

Embodiments of the present invention provide a weighing scale having three wheels that allow for smooth transport on uneven surfaces and may include three load cells summed by a junction box to produce accurate weight measurements.

Embodiments of the present invention provide a weighing scale that is compatible for pails, drums, barrels, cylinders, and other container weighing.

These and other advantages will be apparent from the present application of the embodiments described herein.

The preceding is a simplified summary to provide an understanding of some embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

So, the manner in which the above recited features of the present embodiments may be understood in detail, a more particular description of embodiments of the present invention, briefly summarized above, may be had by reference to embodiments, several of which are illustrated in the appended drawings.

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein.

Figure 1:
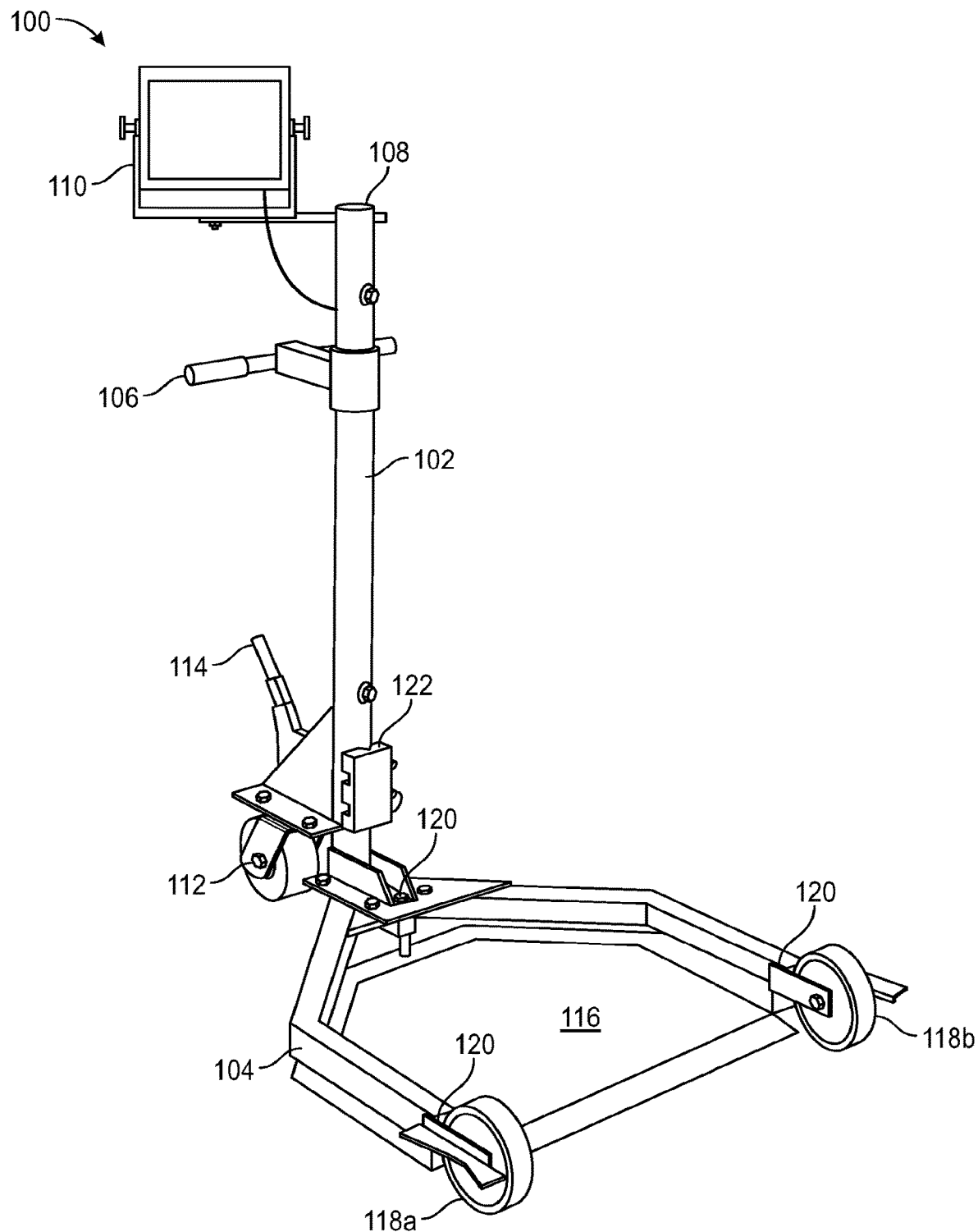
FIG. 1 illustrates a mobile weighing scale, according to an embodiment of the present invention.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the particular form disclosed, but to the contrary, the present disclosure is to cover all modifications, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

It will be noted that throughout the appended drawings, like features are identified by like reference numerals.

DETAILED DESCRIPTION

In the following detailed description, numerous specific details are set forth in order to provide a thorough understanding of embodiments or other examples described herein. In some instances, well-known methods, procedures, components and/or circuits have not been described in detail, so as to not obscure the following description.

Further, the examples disclosed are for exemplary purposes only and other examples may be employed in lieu of, or in combination with, the examples disclosed. It should also be noted the examples presented herein should not be construed as limiting of the scope of embodiments of the present disclosure, as other equally effective examples are possible and likely.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 depicts a weighing scale 100, according to an embodiment of the present invention. The weighing scale 100 includes a column 102 and a base metal tubing 104. In an embodiment of the present invention, the column 102 is a hollow metal tube to enable mounting of various components of the weighing scale 100. In an embodiment of the present invention, the column 102 may be a cylindrical shaped hollow metal tube. In another embodiment of the present invention, the column 102 may be a square shaped hollow metal tube. Further, the column 102 is removable to allow for condensed packaging of the weighing scale 100, in an embodiment of the present invention.

Further, the weighing scale 100 comprises a handle 106, an instrument mount 108 and an electronic indicator 110 (hereinafter referred to as an "indicator 110") mounted on the column 102. The handle 106 can be vertically positioned along the column 102 for adjustment. In an embodiment of the present invention, the handle 106 may be connected to the column 102 by using fasteners. In another embodiment of the present invention, the handle 106 may be connected to an extendable rod that is further connected to the column 102. In an embodiment of the present invention, the handle 106 has textured grips for easier handling of objects and pushing the weighing scale 100 even when objects are placed on the weighing scale 100.

In an embodiment of the present invention, the textured grip may be formed of, but is not restricted to, a rubber, a foam, or a combination thereof. In an exemplary scenario, the handle 106 may be pushed and/or pulled to relocate the weighing scale 100 to a desired location. The handle 106 may be adjustable in height along the height of the column 102. Therefore, the height of the handle 106 may be adjusted based on requirement or height of the operator of the weighing scale 100.

The instrument mount 108 enables the indicator 110 to be mounted on the weighing scale 100. In an embodiment of the present invention, the instrument mount 108 may be an articulating indicator mount. The articulating indicator mount may be a knob having two thrust bearings, a lower rubber spacer and threaded receiver that is mounted internal to the column 102. The indicator 110 may be a display for presenting the weight measurement (interchangeably referred to as "weighment") of the object to be weighed. Further, the indicator 110 may be used to set or control initial readings such as setting tare or zero, or turn-on or switch-off the measurement, and other controls.

In an embodiment of the present invention, the indicator 110 may include, but is not restricted to, a digital and/or analog screen for displaying weight of an object, knobs for setting readings, buttons for automatically adjusting height of a weighing platform and/or the handle 106, and so forth.

In another embodiment of the present invention, the indicator 108 may include a communication unit (not shown) having a wireless communication link (not shown) to communicate the computed weight to a remote computing unit for data collection. The wireless communication link may be, but not limited to, Wi-Fi, Bluetooth™, and other wireless communication techniques. Embodiments are intended to include or otherwise cover any type of wireless communication link, including known, related art, and/or later developed technologies to communicate computed weight measurement to a remote computing unit.

Further, the weighing scale 100 comprises a rear wheel 112 and a braking mechanism 114 (hereinafter referred to as a "brake 114") connected to the column 102. In an embodiment of the present invention, the rear wheel 112 is a kingpin-less swivel castor that can rotate or swivel by 360 degrees. Therefore, the weighing scale 100 can be rotated in any direction. Embodiments of the present invention may include any other type of wheel including known, related art, and/or later developed technologies that may be beneficial to rotate the weighing scale 100 by 360 degrees.

The brake 114 may actuate a rear wheel brake to the rear wheel 112 and enables locking of the rear wheel 112 in any position of 360 degrees. Therefore, an operator of the weighing scale 100 may not be required to chase a brake pedal that are generally mounted on the wheels.

In an embodiment of the present invention, the base tubing 104, which may be made of metal or plastic or any material capable of holding a rigid form, is a hollow tube, removably connected to the column 102. In this embodiment, it is metal. The base metal tubing 104 is also connected to front wheels 118a and 118b. The front wheels 118a-b may include brakes to limit movement of the weighing scale 100. Embodiments of the present invention may include any type of wheels and brakes including known, related art, and/or later developed technologies that may be beneficial to move and/or limit the movement of the weighing scale 100.

In an embodiment of the present invention, the movement of the front wheels 118a-b and the rear wheel 112 may be independently controlled by the brake 114 and brakes attached to 118a-b or all may be engaged simultaneously based on a pre-set configuration of the weighing scale 100. In an embodiment of the present invention, the rear wheel 112 and the front wheels 118a-b may be made of heavy-duty polyurethane with cast iron core. Therefore, the weighing scale 100 can sustain and transport heavy weights over long or uneven surfaces. Further, three wheels allow smooth transport on uneven surfaces and enable the weighing scale 100 to produce accurate weight measurements.

The base metal tubing 104 further includes load cells 120. The load cells 120 are sensors that send electrical signals to the indicator 110, which enables to compute weight of an object to be weighed such that the weight of the object is then displayed on the indicator 110. In an embodiment of the present invention, the weighing scale 100 may include three load cells. In another embodiment of the present invention, the weighing scale 100 may include any number of load cells that may be beneficial to compute weight measurement of an object placed on the weighing scale 100.

Examples of load cell may include, but is not restricted to, a piezoelectric load cell, a hydraulic load cell, a pneumatic load cell, a strain gauge load cell, and so forth. Embodiments of the present invention may include any other type of load cell including known, related art, and/or later developed technologies that may be beneficial to compute weight of an object. The load cells 120 are mounted internal to the top of the base metal tubing 104 and are connected to a weighing platform 116. As the load cells 120 are mounted internal to the top of the metal tubing 104, any build up from spilled material around the load cells 120 can be avoided. In an embodiment of the present invention, the load cells 120 are made of steel such as alloy steel IP67 and designed at about 300% safe overload.

Further, the load cells 120 are connected to a junction box 122. The junction box 122 may sum up and/or adjust output signals received from the load cells 120 to produce an accurate weighing measurement irrespective of the position of an object placed on a weighing platform 116. A housing of the junction box 122 may be made up of, but is not restricted to, a plastic, a metal, or a combination thereof.

Figure 2A:
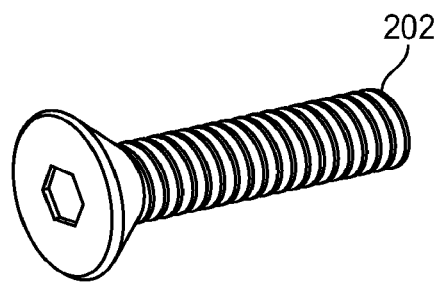
FIGS. 2A-2C illustrate fasteners used in a weighing platform, according to an embodiment of the present invention.
Figure 2B:
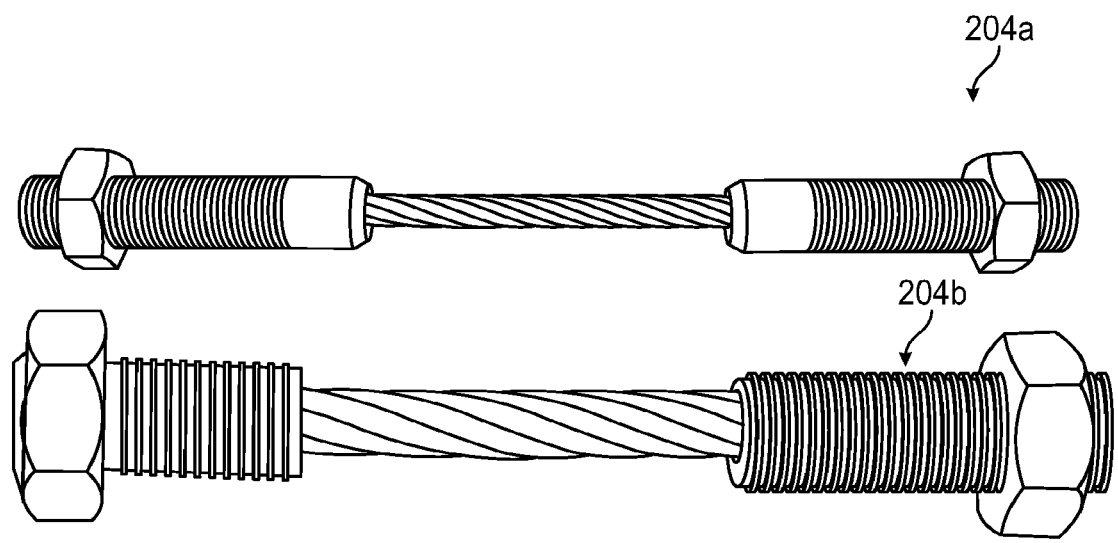
Figure 2C:

The weighing platform 116 may be connected to the load cells 120 via the base metal tubing 104 by using fasteners as shown in FIGS. 2A-2C. For example, the fastener may be steel metal, hex drive flat head bolts (as shown in FIG. 2A) with rubber grommets and retainer nuts. Moreover, the head of the bolt may ride in a countersink on the underside of the weighing platform 116. Therefore, the bolts may self-center for repeatable weighments. In another embodiment of the present invention, wire rope bolts 204a and 204b, as shown in FIG. 2B, may also be used for increased horizontal movement of the weighing platform 116 without causing weight distortions. In addition, a spherical washer, as shown in FIG. 2C, may be used to align the weighing platform 116 to the load cells 120.

Figure 3:
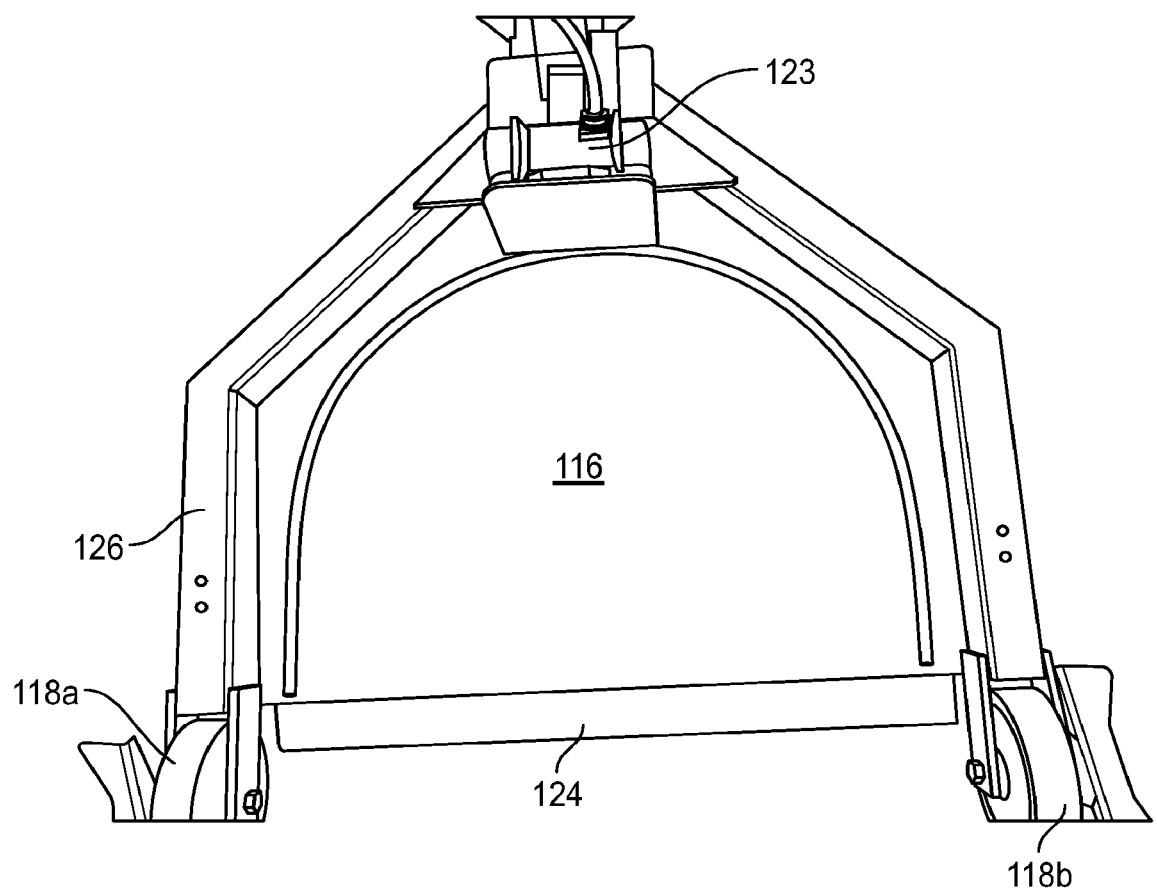
FIG. 3 illustrates a top view of the weighing platform of the mobile weighing scale, according to an embodiment of the present invention.

FIG. 3 illustrates a top view of the weighing platform 116 of the weighing scale 100, according to an embodiment of the present invention. The weighing platform 116 is generally triangular shaped, in an embodiment of the present invention. In another embodiment of the present invention, the weighing platform 116 can include or cover any other shape that may be beneficial to hold an object for weighing purpose.

In an exemplary embodiment of the present invention, size of the weighing platform 116 may be about 24 inches wide and 24 inches long. The weighing platform 116 may be made up of stainless steel with a glass beaded finish, in an embodiment of the present invention.

Further, the weighing scale 100 may include a vibrator 123 according to an embodiment of the present invention. The vibrator 123 may be attached to the metal tubing 132 (See FIG. 4) in order to densify a product in an object during filling. The densification of the material may reduce and/or eliminate air within the product being filled in the object, which further allows a more complete fill of the product within the object. The vibrator 123 may produce vibratory force that oscillates the weighing platform 116 in a horizontal motion, in an embodiment of the present invention. The vibrator 123 may be driven by a power supply, such as a battery, in an embodiment of the present invention. In another embodiment of the present invention, the vibrator may be driven by the power source of the weighing scale 100.

Further, the weighing platform 116 may include a ramp 124 to enable easy and safe loading and unloading of objects on the weighing platform 116. In an embodiment of the present invention, the weighing scale 100 has a very low profile. For example, the weighing platform 116 may be about 1 inch above the ground and the ramp 124 is about 0.25 inch above the ground. Therefore, the objects to be weighed can easily be loaded or unloaded without requiring additional lifting mechanisms, like beaks or clamps. Further, the ramp 124 provides rigidity and stiffness to the weighing platform 116. In an embodiment of the present invention, the weighing platform 116 may have a ring 126 welded around the periphery. The ring 126 may enable limiting of the movement of the object placed on the weighing platform 116. Therefore, an object such as a barrel or a filled container cannot contact the structure such as the column 102 or the base metal tubing 104 of the weighing scale 100. As a result, the accuracy of weight measurement is improved. Further, the weighing platform 116 is electronically connected to the indicator 110 to display measured weight of an object placed on the weighing platform 116.

Further, the weighing scale 100 may include a readable spirit or bubble level or other level indicating device to indicate the levelness of the area or surface where the measurement is being performed, in an embodiment of the present invention. The readable level indicating device may be provided near the indicator 110 for easier reading and adjustment of the weighing scale 100.

In an embodiment of the present invention, the weighing scale 100 may include a clinometer to auto correct for out of level weighments. The clinometer may be installed near the load cells 120 to compensate the effect of uneven surfaces, in an embodiment of the present invention. In another embodiment of the present invention, the clinometer may be integrated with the load cells 120. The load cells 120 with the help of clinometer may send an accurate output signals to the junction box 122.

Figure 4:
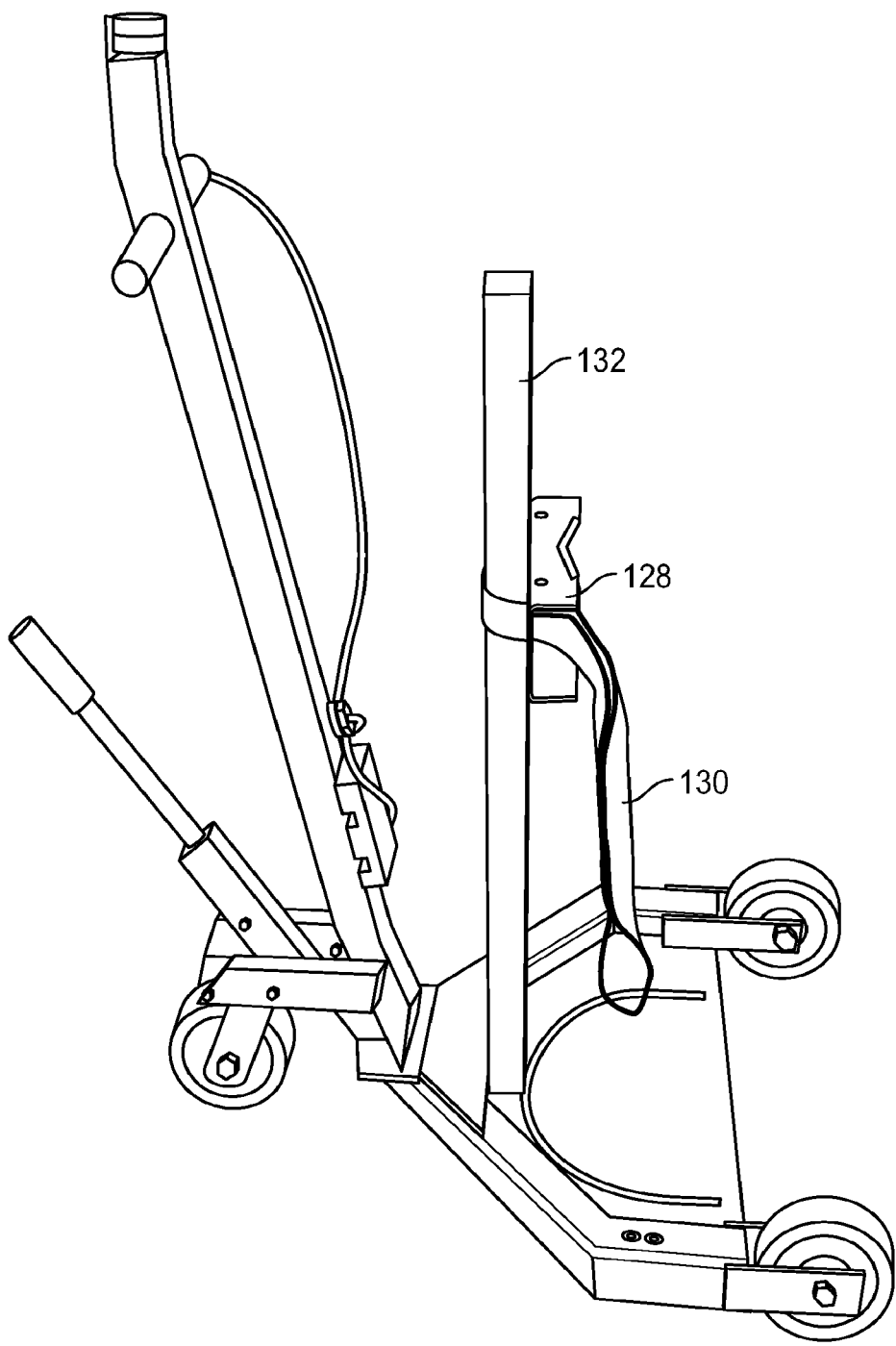
FIG. 4 illustrates a side view of the weighing platform having an object retained stack for holding an object, according to an embodiment of the present invention.

The weighing scale 100 may further include a cylinder or object restraint stand 128 (as shown in FIG. 4), in an embodiment of the present invention. The object restraint stand 128 may enable transport of objects that may be small in diameter or width but tall and normally unstable if left unrestrained. Therefore, by using the object restraint stand 128, the objects can safely be transported while placed on the weighing platform 116. In an embodiment of the present invention, the object restraint stand 128 may be made up of powder-coated steel for holding an object such as a cylinder. The object restraint stand 128 may be wall-mounted rack, in an embodiment of the present invention. The object restraint stand 128 may include a strap 130 for holding an object that may be small in diameter or width or may be tall or small in height.

The object restraint stand 128 may be attached to the weighing platform 116 of the weighing scale 100. In an embodiment of the present invention, the object restraint stand 128 may be wall-mounted on a metal tubing 132. In an embodiment of the present invention, the object restraint stand 128 may be adjustable in height along the height of the metal tubing 132.

The metal tubing 132 may be a hollow metal tube that may be removably connected to the base of the weighing platform 116. In an embodiment of the present invention, the object restraint stand 128 may be mounted on a square metal tubing 132. In another embodiment of the present invention, the object restraint stand 128 may be mounted on a cylindrical metal tubing 132.

Figure 5A:
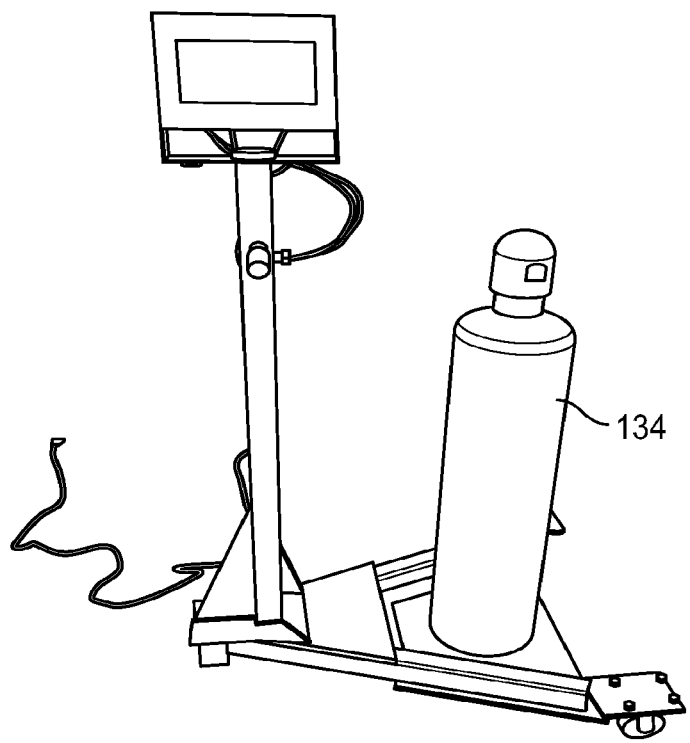
FIG. 5A illustrates a cylinder placed on the weighing scale 100 for weight measurement, according to an embodiment of the present invention.
Figure 5B:
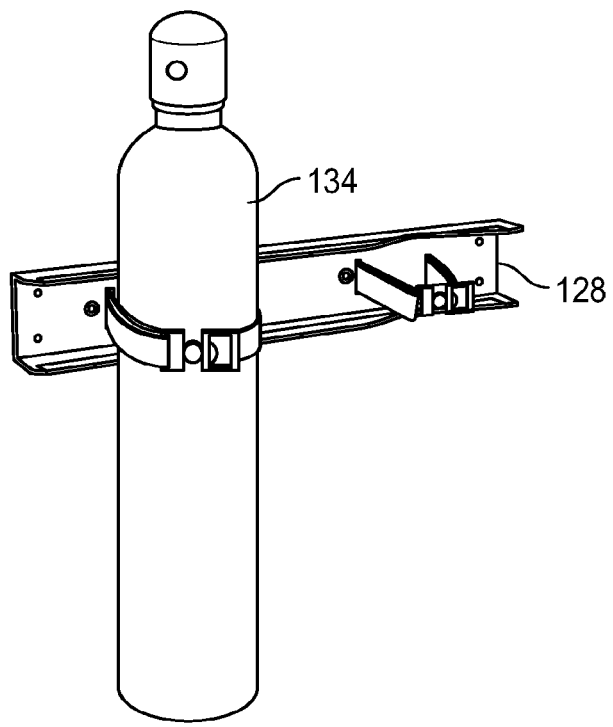
FIG. 5B depicts a perspective view of the object retained stack holding a cylinder, according to an embodiment of the present invention.
Figure 6:
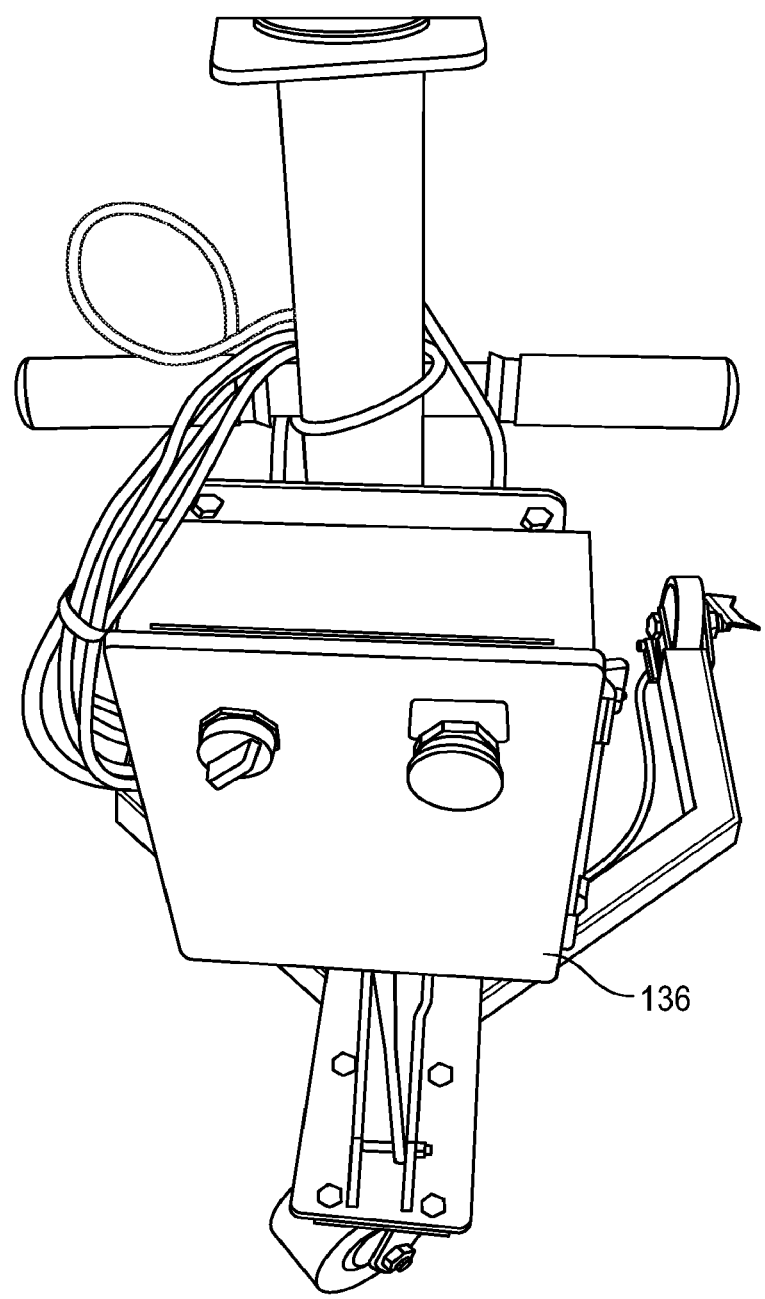
FIG. 6 illustrates a power source connected to the weighing scale, according to an embodiment of the present invention.

FIG. 5A illustrates a cylinder 134 placed on the weighing scale 100 for weight measurement, according to an exemplary scenario of the present invention. Due to a small diameter of the cylinder 134, it would be unstable during filling, weighing, or even transporting the cylinder to another location. In order to overcome the problem, the object restraint stand 128 may be used, which holds the cylinder 134 in an upright position, as shown in FIG. 5B. In another embodiment of the present invention, the object restraint stand 128 may hold two small diameter cylinders.

In an embodiment of the present invention, the weighing scale 100 may be require a power source 136 to operate. The power source 136 may be for example, a battery. In another embodiment of the present invention, the electrical supply to the weighing scale 100 may be provided by externally connecting the weighing scale 100 to an AC power source with the help of a wire.

Figure 7:
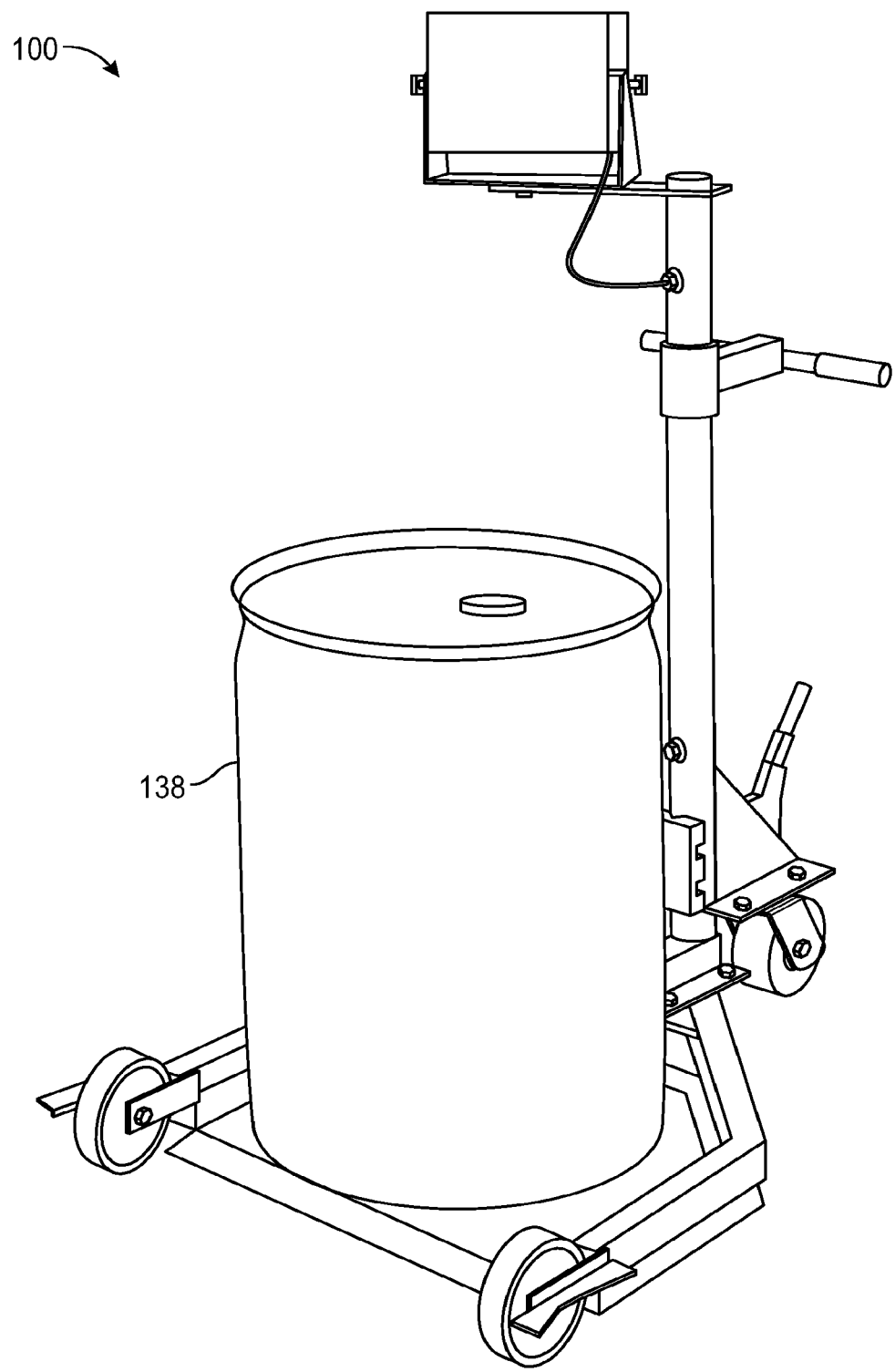
FIG. 7 illustrates the weighing scale with an object to be weighed, according to an embodiment of the present invention.

FIG. 7 illustrates the weighing scale 100 with an object 138 to be weighed, according to an embodiment of the present invention. As shown, the object 138 can easily be placed on the weighing platform 116. The weighing scale 100 allows filling, weighing and transporting objects such as barrels, drums, pails, buckets, and cylinders.

In an embodiment of the present invention, the components of the weighing scale 100 are fabricated with heavy duty tube steel for a durable and accurate performance. Moreover, the components of the weighing scale 100 may be coated with industrial polymer to prevent damage caused from scratches, rust and environment. Further, the components such as the instrument mount 108 or the indicator 110 may be repositioned for ease of viewing during the measurement. As these components are not a part of live load in case of weighing scale 100, their alignment does not affect the weighment of the object.

Figure 8:
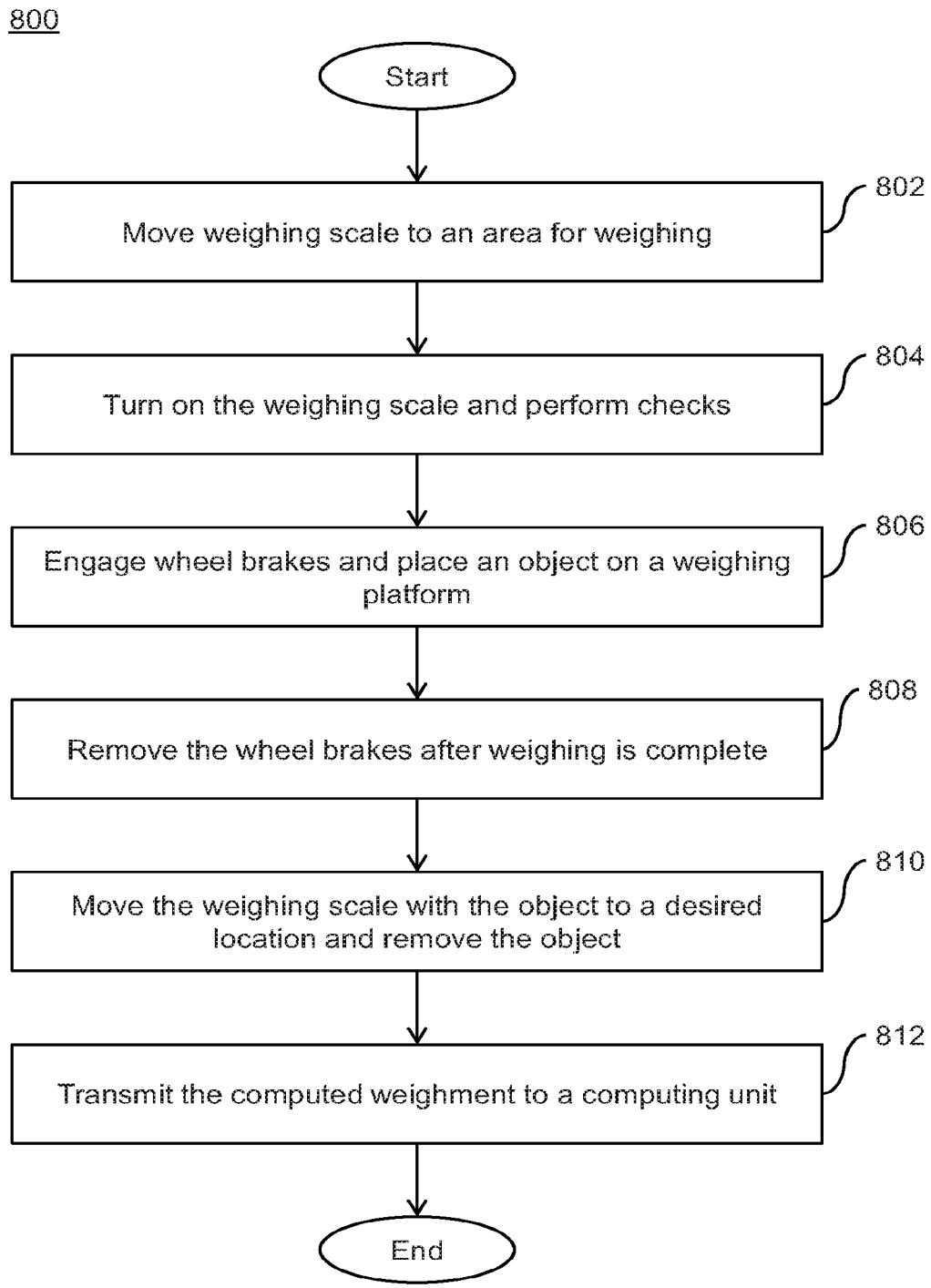
FIG. 8 is a flowchart illustrating the use of the weighing scale, according to an embodiment of the present invention.

FIG. 8 is a flowchart illustrating the use of the weighing scale 100, according to an embodiment of the present invention. At step 802, the weighing scale 100 is moved to a desired area for weighing an object. For example, in an industrial environment, the weighing scale 100 may be moved inside a warehouse to the place of an object. Thereafter, at step 804, the weighing scale 100 is turned on and checked for any errors.

In an embodiment of the present invention, turning on the weighing scale 100 may require switching on a battery or plugging in a suitable power source. Further, the weighing scale 100 may be checked for level by using a spirit level or other level indicating device. The level may then be adjusted manually, or a clinometer may be used to perform an automatic adjustment. Subsequently, a zero function is performed, so that the indicator 110 reads a zero and the weighing scale 100 is ready for weight measurement.

At step 806, wheel brakes are engaged to stop or limit any movement of the weighing scale 100. Thereafter, the object to be weighed is loaded on the weighing platform 116. In an embodiment of the present invention, the object is loaded by using the ramp 124. Subsequently, at step 808, the weighing is completed, and the brakes are disengaged. In an exemplary scenario, when a net filling is required in a container, the weighing scale 100 may be tared or zeroed after an empty container or object is placed on the weighing platform 116. Thereafter, the container may be filled till desired weight measurement. In addition, if required, the vibrator may be turned on to densify and settle the material during its filling within the object.

In another exemplary scenario, when a weight discharge is required from a container, the weighing scale 100 may be tared or zeroed once the container with contents is placed. Thereafter, the content of the container may be discharged as per desired weight measurement. For example, the indicator 110 may display a negative value according to the weight discharged.

At step 810, the weighing scale 100 may be transported along with the object placed on the weighing platform 116 to a desired location. For example, another location within a warehouse of an industry where the object is required. Subsequently, the wheel brakes are reengaged and the object is removed from the weighing scale 100 at the desired location. In an embodiment of the present invention, an object restrained stand 128 may be used while transporting the object on the weighing scale 100.

Further, at step 812, the computed weight measurement of the object placed on the weighing platform is transmitted to a computing unit for data collection. The computed weight measurement may be transmitted to the computing unit through the communication unit, in an embodiment of the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure.

The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed.

Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

What is claimed is:

1. A mobile weighing apparatus, comprising:
   a structure that includes a base tubing and a column extending from the base tubing;
   a handle extending from the column;
   a plurality of wheels coupled to the structure;
   a weighing platform;
   one or more load cells coupled between the base tubing and the weighing platform;
   a rear wheel that can swivel through 360 degrees, coupled to the structure;
   a rear wheel brake to preclude rotation of the rear wheel about an axle of the rear wheel; and
   a brake actuator configured to actuate the rear brake when the rear wheel is in any position of the 360 degrees.

2. The mobile weighing apparatus of claim 1, wherein the weighting platform is suspended from the load cells.

3. The mobile weighing apparatus of claim 2, wherein the weighting platform is suspended from the load cells such that a force applied to the column does not affect weighment of an object on the weighing platform.

4. The mobile weighing apparatus of claim 2, further including:
   bolts to suspend the weighing platform from the load cells.

5. The mobile weighing apparatus of claim 4, wherein the bolts include:
   wire rope bolts to suspend the weighing platform from the load cells.

6. The mobile weighing apparatus of claim 1, wherein the load cells are mounted to an internal upper portion of the base tubing.

7. The mobile weighing apparatus of claim 1, further including:
   an indicator mounted to an upper portion of the column;
   wherein the indicator is repositionable during weighment of an object on the weighing platform without affecting the weighment of the object.

8. The mobile weighing apparatus of claim 1, further including:
   an indicator mount coupled to an upper portion of the column;
   wherein the indicator mount is repositionable during weighment of an object on the weighing platform without affecting the weighment of the object.

9. The mobile weighing apparatus of claim 8, wherein the indicator mount includes an articulating indicator mount, and wherein the articulating indicator mount includes a knob having first and second thrust bearings, a lower rubber spacer, and a threaded receiver mounted within the column.

10. The mobile weighing apparatus of claim 1, further including:
    a ring welded around a periphery of the weighing platform to preclude an object on the weighing platform from contacting the structure.

11. The mobile weighing apparatus of claim 1, further including:
    a restraint stand extending from the weighing platform to secure an object on the weighing platform.

12. The mobile weighing apparatus of claim 11, wherein the restraint stand is removably attached to the weighing platform.

13. The mobile weighing apparatus of claim 1, wherein the column is removably attached to the base tubing.

14. The mobile weighing apparatus of claim 1, wherein the handle is repositionable along a length of the column.

15. A mobile weighing apparatus, comprising:
    a structure that includes a base tubing and a column extending from the base tubing;
    a handle extending from the column;
    one or more load cells coupled to the base tubing;
    a weighing platform coupled to the one or more load cells;
    a kingpin-less swivel rear wheel that can swivel through 360 degrees, coupled to the structure;
    a rear wheel brake to preclude rotation of the rear wheel about an axle of the rear wheel; and
    a brake actuator coupled to the structure to actuate the rear brake when the rear wheel is in any position of the 360 degrees.

16. The mobile weighing apparatus of claim 15, further including:
    multiple additional wheels coupled to the structure; and
    multiple additional brakes, each to preclude rotation of a respective one of the additional wheels;
    wherein the brake actuator is configured to actuate the rear brake and the multiple additional brakes independent of one another.

17. The mobile weighing apparatus of claim 15, further including:
    multiple additional wheels coupled to the structure; and
    multiple additional brakes, each to preclude rotation of a respective one of the additional wheels;
    wherein the brake actuator is configured to actuate the rear brake and the multiple additional brakes independently.

18. A mobile weighing apparatus, comprising:
    a structure that includes a base tubing and a column extending from the base tubing;
    a handle extending from the column;
    a plurality of wheels coupled to the structure in a triangular pattern, the plurality of wheels including a rear wheel that can swivel through 360 degrees;

one or more load cells coupled to the base;
a weighing platform coupled to the load cells;
a rear wheel brake to preclude rotation of the rear wheel about an axle of the rear wheel; and
a brake actuator configured to actuate the rear brake when the rear wheel is in any position of the 360 degrees.

19. The mobile weighing apparatus of claim 18, wherein:
the base tubing has a triangular shape; and
the plurality of wheels are positioned adjacent respective corners of the triangularly-shaped base tubing.

20. The mobile weighing apparatus of claim 18, further including:
a clinometer to correct for out-of-level weighment of an object on the weighing platform.

\* \* \* \* \*